(12) United States Patent  
Pasquero et al.

(10) Patent No.: US 8,451,240 B2
(45) Date of Patent: May 28, 2013

(54) ELECTRONIC DEVICE AND METHOD OF PROVIDING TACTILE FEEDBACK

(75) Inventors: Jerome Pasquero, Kitchener (CA); David Ryan Walker, Waterloo (CA)

(73) Assignee: Research In Motion Limited, Waterloo (CA)

( * ) Notice: Subject to any disclaimer, the term of this patent is extended or adjusted under 35 U.S.C. 154(b) by 415 days.

(21) Appl. No.: 12/814,127

(22) Filed: Jun. 11, 2010

(65) Prior Publication Data

US 2011/0304558 A1    Dec. 15, 2011

(51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| | | | |
|---|---|---|---|
| 3,813,658 A | 5/1974 | Rich | |
| 3,965,599 A | 6/1976 | Ebner | |
| 4,631,700 A | 12/1986 | Lapeyre | |
| 4,906,988 A | 3/1990 | Copella | |
| 4,942,275 A | 7/1990 | Addy et al. | |
| 5,450,078 A | 9/1995 | Silva et al. | |
| 5,572,573 A * | 11/1996 | Sylvan et al. | 345/173 |
| 5,841,428 A | 11/1998 | Jaeger et al. | |
| 6,415,138 B2 * | 7/2002 | Sirola et al. | 345/173 |
| 6,545,577 B2 | 4/2003 | Yap | |
| 6,636,203 B1 * | 10/2003 | Wong et al. | 345/173 |
| 6,667,738 B2 | 12/2003 | Murphy | |
| 6,763,995 B1 | 7/2004 | Song | |
| 7,091,953 B1 | 8/2006 | Kramer | |
| 7,184,032 B2 | 2/2007 | Stohrer et al. | |
| 7,187,394 B2 | 3/2007 | Chandane | |
| 7,403,191 B2 * | 7/2008 | Sinclair | 345/173 |
| 7,479,943 B1 * | 1/2009 | Lunsford et al. | 345/169 |
| 2001/0051329 A1 | 12/2001 | Lynch et al. | |
| 2002/0163509 A1 * | 11/2002 | Roberts | 345/173 |
| 2003/0022701 A1 * | 1/2003 | Gupta | 455/566 |
| 2003/0071859 A1 | 4/2003 | Takami | |
| 2003/0235452 A1 | 12/2003 | Kraus et al. | |
| 2005/0030292 A1 | 2/2005 | Diederiks | |
| 2005/0140497 A1 | 6/2005 | Chiviendacz et al. | |
| 2005/0206622 A1 * | 9/2005 | Cote et al. | 345/169 |

(Continued)

FOREIGN PATENT DOCUMENTS

EP 0915411 A2 5/1999
EP 0992953 A 4/2000

(Continued)

OTHER PUBLICATIONS

Extended European Search Report dated Jun. 28, 2011, issued from the corresponding EP patent application No. 10165744.3.

(Continued)

*Primary Examiner* — Adam J Snyder
(74) *Attorney, Agent, or Firm* — Geoffrey deKleine; Borden Ladner Gervais LLP

(57) ABSTRACT

A method includes detecting a sheet corresponding to a plurality of characters on a touch-sensitive input device; detecting, by the touch-sensitive input device, a touch; determining a next character output; in response to determining that the touch is associated with a location on the sheet, which location is associated with the next character, providing tactile feedback to identify the next character.

30 Claims, 5 Drawing Sheets

U.S. PATENT DOCUMENTS

| | | | |
|---|---|---|---|
| 2006/0172266 | A1 | 8/2006 | Rogers |
| 2006/0181515 | A1* | 8/2006 | Fletcher et al. ............... 345/173 |
| 2006/0256090 | A1 | 11/2006 | Huppi |
| 2007/0013662 | A1* | 1/2007 | Fauth ............................ 345/168 |
| 2007/0212668 | A1* | 9/2007 | Takami et al. ................ 434/113 |
| 2007/0254707 | A1 | 11/2007 | Griffin et al. |
| 2008/0020356 | A1 | 1/2008 | Saba |
| 2008/0067231 | A1 | 3/2008 | Song |
| 2008/0111798 | A1* | 5/2008 | Oveisi ........................... 345/179 |
| 2008/0122805 | A1 | 5/2008 | Smith et al. |
| 2009/0079698 | A1 | 3/2009 | Takashima et al. |
| 2009/0237364 | A1* | 9/2009 | Bloomcamp et al. ......... 345/173 |
| 2009/0296341 | A1 | 12/2009 | Eldershaw |
| 2010/0055651 | A1* | 3/2010 | Rantala et al. ................ 434/114 |
| 2010/0079403 | A1 | 4/2010 | Lynch et al. |
| 2010/0182245 | A1 | 7/2010 | Edwards et al. |
| 2010/0231550 | A1* | 9/2010 | Cruz-Hernandez et al. .. 345/174 |
| 2010/0238053 | A1 | 9/2010 | Schmidt et al. |
| 2010/0328052 | A1 | 12/2010 | Pasquero et al. |

FOREIGN PATENT DOCUMENTS

| | | |
|---|---|---|
| GB | 2140943 A | 12/1984 |
| WO | 9107715 A | 5/1991 |
| WO | 03047007 A1 | 6/2003 |
| WO | 2005088425 A | 9/2005 |

OTHER PUBLICATIONS

Rantala et al., "Methods for Presenting Braille Characters on a Mobile Device with a Touchscreen and Tactile Feedback", IEEE Transactions on Haptics, vol. 2, No. 1, Jan.-Mar. 2009, pp. 28-39.

Ananthaswamy, "Vibrating Touch Screen Puts Braille at the Fingertips", http://www.newscientist.com/article/mg20127015.700-vibrating-touch-screen-puts-braille-at-the-fingertrips.html, Mar. 31, 2009, 1 page.

"Standards Group Pushes for Electronic Braille Reader", http://news.cnet.com/Standards-group-pushes-for-electronic-braille-rader/2100-1023_3-245933.html, Sep. 19, 2000, 2 pages.

"Technology", American Foundation for the Blind, http://www.afb.org/Section.asp?SectionID=4&TopicID-31$DocumentID=1282, published at least as early as Dec. 2009, 2 pages.

"Braille Stick-Ons—PC", www.Issproducts.com/products/3900/braille-writing, published at least as early as Dec. 2009, pp. 1-2.

McGookin, David et al., Investigating Touchscreen Accessibility for People with Visual Impairments, NordiCHI 2008: Using Bridges, Oct. 18-22, Lund, Sweden, 2008.

Printout of "T3 Talking Tactile Technology, Royal National College for the Blind"; retrieved on Jun. 16, 2009 from http://www.mcb.ac.uk/t3/index.html.

Honeywell Manual, "Hall Effect Sensing and Application", U.S. Appl. No. 12/494,566, filed Sep. 28, 2012.

Printout of "Dictionary, Associate", U.S. Appl. No. 12/494,566, filed Sep. 28, 2012.

Printout of "East Search History (Prior Art)", U.S. Appl. No. 12/494,566, filed Apr. 26, 2012.

Printout of "Magnetic field"; retrieved on Sep. 4, 2012 from http://en.wikipedia.org/wiki/Magnetic_field.

* cited by examiner

ELECTRONIC DEVICE AND METHOD OF PROVIDING TACTILE FEEDBACK

FIELD OF TECHNOLOGY

The present disclosure relates to electronic devices including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 702.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed.

Improvements in devices with touch-sensitive displays are desirable.

DETAILED DESCRIPTION

Figure 1:
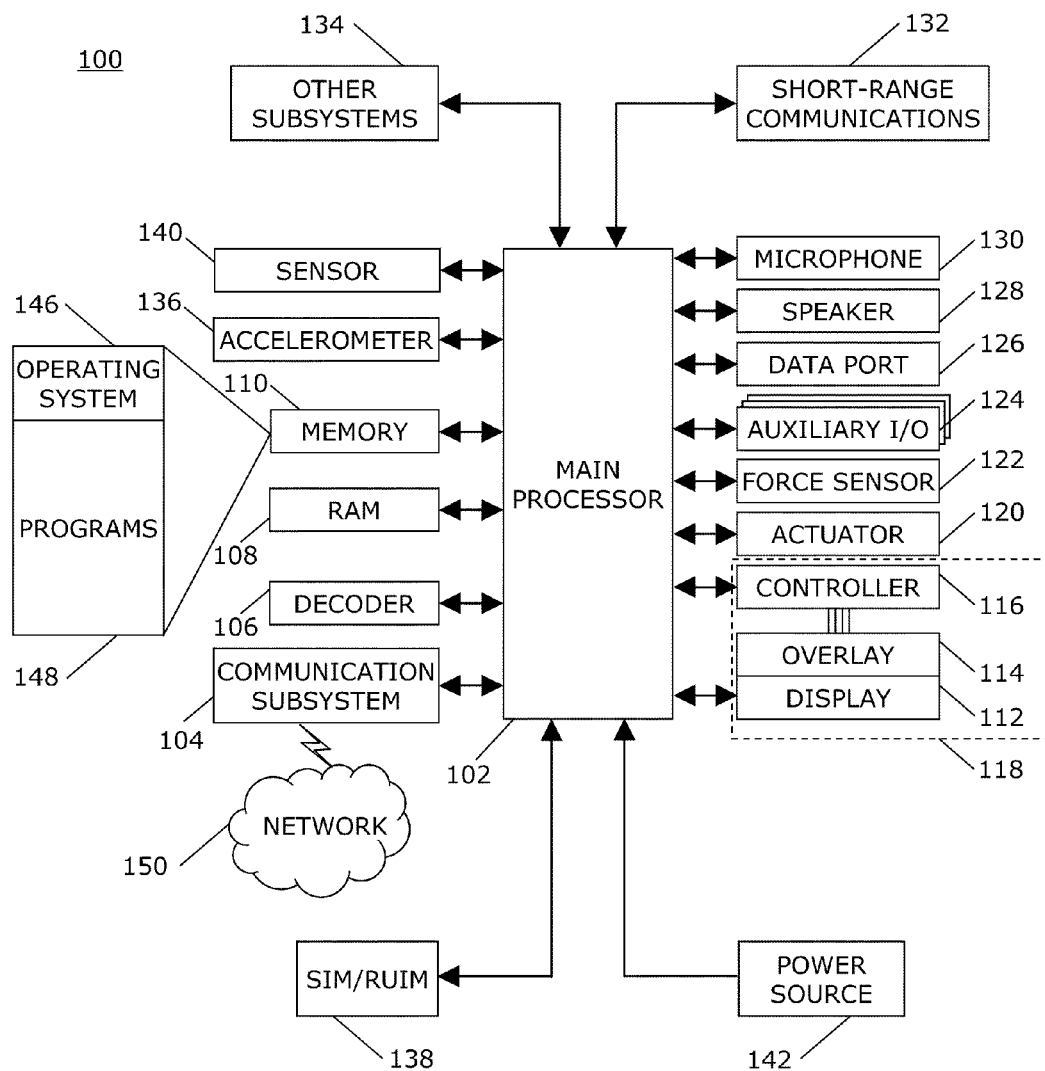
FIG. 1 is a block diagram of a portable electronic device in accordance with the present disclosure.

The following describes an electronic device and method including detecting a sheet corresponding to a plurality of characters on a touch-sensitive input device, detecting, by the touch-sensitive input device, a touch, determining a next character output, and in response to determining that the touch is associated with a location on the sheet, which location is associated with the next character, providing tactile feedback to identify the next character. The method may be utilized to facilitate output for the visually impaired.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

The processor 102 may also interact with a sensor 140, which may be, for example, a Hall effect sensor, to detect a sheet disposed on the touch-sensitive display 118. Alternatively, the sensor 140 may be, for example, a mechanical sensor or any other suitable sensor to detect the sheet disposed on the touch-sensitive display 118.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb or appendage. The controller 116 and/or the processor 102 may detect a touch by any suitable contact member on the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback. Other different types of actuators 120 may be utilized than those described herein. When force is applied, the touch-sensitive display 118 is depressible, pivotable, and/or movable.

Figure 2:
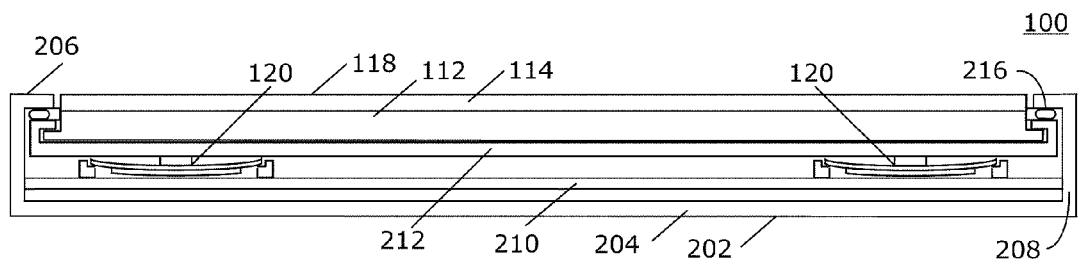
FIG. 2 is a sectional side view of a portable electronic device with piezoelectric actuators in accordance with the disclosure.

A cross section of a portable electronic device 100 taken through the centers of piezoelectric ("piezo") actuators 120 is shown in FIG. 2. The portable electronic device 100 includes a housing 202 that encloses components such as shown in FIG. 1. The housing 202 may include a back 204, sidewalls 208, and a frame 206 that houses the touch-sensitive display 118. A base 210 extends between the sidewalls 208, generally parallel to the back 204, and supports the actuators 120. The display 112 and the overlay 114 are supported on a support tray 212 of suitable material, such as magnesium. Optional spacers 216 may be located between the support tray 212 and the frame 206, may advantageously be flexible, and may also be compliant or compressible, and may comprise gel pads, spring elements such as leaf springs, foam, and so forth.

Figure 3:
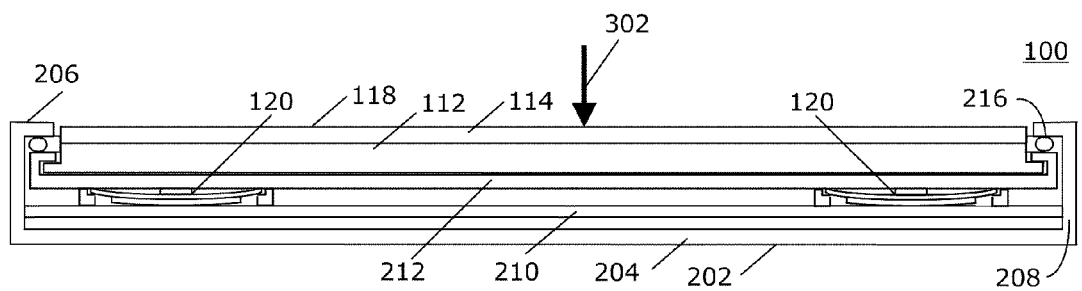
FIG. 3 is a sectional side view of a portable electronic device with a depressed touch-sensitive display in accordance with the disclosure.

The touch-sensitive display 118 is moveable and depressible with respect to the housing 202. A force 302 applied to the touch-sensitive display 118 moves, or depresses, the touch-sensitive display 118 toward the base 210. When sufficient force is applied, the actuator 120 is depressed or actuated as shown in FIG. 3. The touch-sensitive display 118 may also pivot within the housing to depress the actuator 120. The actuators 120 may be actuated by pressing anywhere on the touch-sensitive display 118. The processor 102 receives a signal when the actuator 120 is depressed or actuated.

Figure 4:
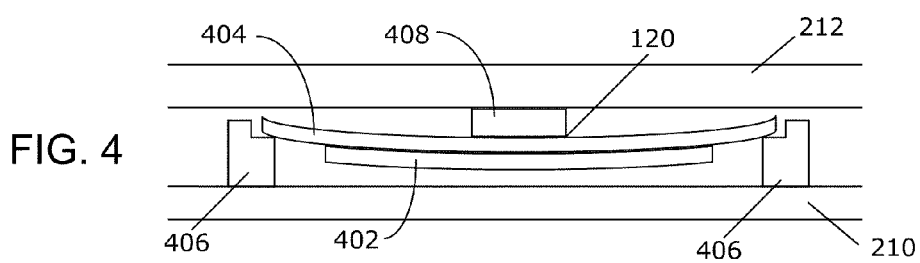
FIG. 4 is a sectional side view of a piezoelectric actuator in accordance with the disclosure.

A cross section taken through the center of a piezo actuator 120 is shown in FIG. 4. The actuator 120 may comprise one or more piezo devices or elements 402. The piezo actuator 120 is shown disposed between the base 210 and the touch-sensitive display 118. The piezo actuator 120 includes a piezoelectric element 402, such as a piezoelectric ceramic disk, fastened to a substrate 404, for example, by adhesive, lamination, laser welding, and/or by other suitable fastening method or device. The piezoelectric material may be lead zirconate titanate or any other suitable material. Although the piezo element 402 is a ceramic disk in this example, the piezoelectric material may have any suitable shape and geometrical features, for example a non-constant thickness.

The substrate 404, which may also be referred to as a shim, may be comprised of a metal, such as nickel, or any other suitable material such as, for example, stainless steel, brass, and so forth. The substrate 404 bends when the piezo element 402 contracts diametrically, as a result of build up of voltage/charge across the piezo element 402 or in response to a force, such as an external force applied to the touch-sensitive display 118.

The substrate 404 and piezo element 402 may be suspended or disposed on a support 406 such as a ring-shaped frame for supporting the piezo element 402 while permitting flexing of the piezo actuator 120 as shown in FIG. 4. The supports 406 may be disposed on the base 210 or may be part of or integrated with the base 210, which may be a printed circuit board. Optionally, the substrate 404 may rest on the base 210, and each actuator 120 may be disposed, suspended, or preloaded in an opening in the base 210. The actuator 120 is not fastened to the support 406 or the base 210 in these embodiments. The actuator 120 may optionally be fastened to the support 406 through any suitable method, such as adhesive or other bonding methods.

A pad 408 may be disposed between the piezo actuator 120 and the touch-sensitive display 118. The pad 408 in the present example is a compressible element that may provide at least minimal shock-absorbing or buffering protection and may comprise suitable material, such as a hard rubber, silicone, and/or polyester, and/or other materials. The pad 408 is advantageously flexible and resilient and may provide a bumper or cushion for the piezo actuator 120 as well as facilitate actuation of the piezo actuator 120 and/or one or more force sensors 122 that may be disposed between the piezo actuators 120 and the touch-sensitive display 118.

When the touch-sensitive display 118 is depressed, the force sensor 122 generates a force signal that is received and interpreted by the microprocessor 102. The pad 408 is advantageously aligned with a force sensor 122 to facilitate the focus of forces exerted on the touch-sensitive display 118 onto the force sensors 122. The pads 408 transfer forces between the touch-sensitive display 118 and the actuators 120 whether the force sensors 122 are above or below the pads 408. The pads 408 facilitate provision of tactile feedback from the actuators 120 to the touch-sensitive display 118 without substantially dampening the force applied to or on the touch-sensitive display 118.

Figure 5:
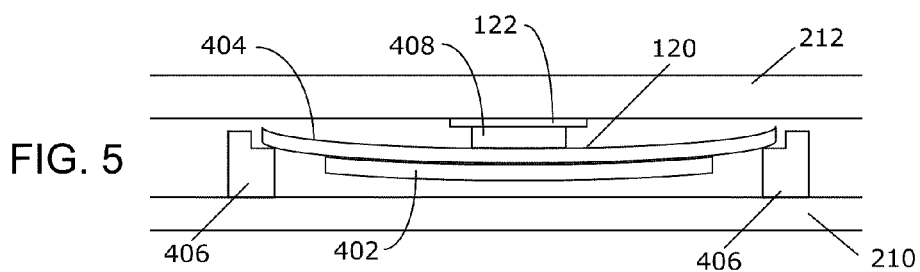
FIG. 5 is a sectional side view of a piezoelectric actuator with a force sensor in accordance with the disclosure.

An optional force sensor 122 may be disposed between the piezo actuator 120 and the touch-sensitive display 118 as shown in FIG. 5. The force sensor 122 may be disposed between the touch-sensitive display 118 and the pad 408 or between the pad and the piezo actuator 120, to name a few examples. The force sensors 122 may be force-sensitive resistors, strain gauges, piezoelectric or piezoresistive devices, pressure sensors, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. A piezoelectric device, which may be the piezo element 402, may be utilized as a force sensor.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 6:
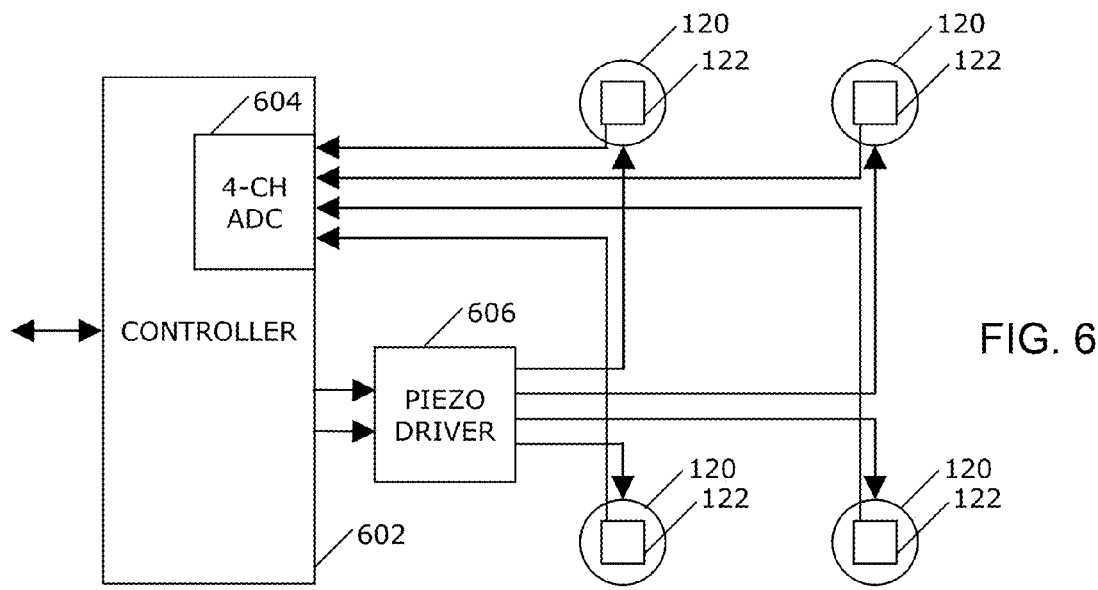
FIG. 6 is a block diagram including force sensors and actuators of the portable electronic device 100 in accordance with the disclosure.

A block diagram including force sensors and actuators of the portable electronic device 100 is shown in FIG. 6. In this example, each force sensor 122 is electrically coupled to a controller 602, which includes an amplifier and analog-to-digital converter (ADC) 604. Each force sensor 122 may be, for example, a force-sensing resistor wherein the resistance changes as force applied to the force sensor 122 changes. As applied force on the touch-sensitive display 118 increases, the resistance decreases. This change is determined via the controller 116 for each of the force sensors 122, and a value related to the force at each of the force sensors 122 may be determined.

The piezo actuators 120 are electrically coupled to a piezo driver 604 that communicates with the controller 602. The controller 602 is also in communication with the main processor 102 of the portable electronic device 100 and may exchange signals with the main processor 102. The piezo actuators 120 and the force sensors 122 are operatively coupled to the main processor 102 via the controller 602. The controller 602 controls the piezo driver 606 that controls the current/voltage across the piezoelectric devices 402 of the actuator 120, and thus the controller 602 controls the force applied by the piezo actuators 120 on the touch-sensitive display 118. The piezoelectric devices 402 may be controlled individually via a separate control line between each actuator 120 and the controller 602. Different signals may be sent to each different actuator 120. Alternatively, the piezoelectric devices 402 may be controlled substantially equally and concurrently, for example, by the same signal that may be provided through a common control line that extends to each actuator 120 or by individual control lines such as shown in FIG. 6.

The tactile feeling of switches, actuators, keys, other physical objects, and so forth may be simulated, or a non-simulated tactile feedback may be provided by controlling the piezoelectric devices 402. For example, when a force applied on the touch-sensitive display 118 exceeds a depression threshold, the voltage/charge at the piezo actuators 120 is modified such that the piezo actuator 120 imparts a force on the touch-sensitive display 118, which force may, for example, simulate depression of a dome switch. When the force applied on the touch-sensitive display 118 falls below a release threshold, the voltage/charge at the piezo actuators 120 is modified such that the piezo actuator 120 imparts a force or discontinues imparting a force on the touch-sensitive display 118, which may, for example, simulate release of a dome switch.

Figure 7:
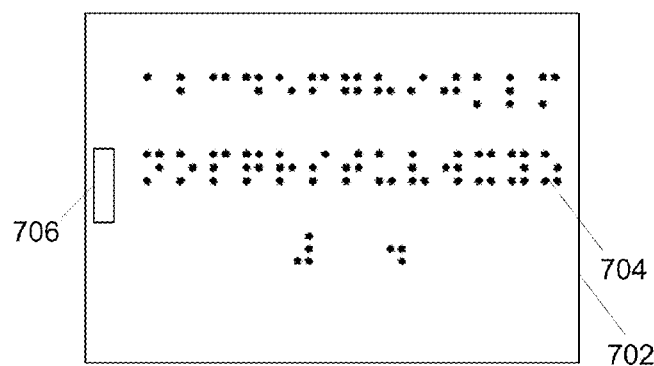
FIG. 7 is a top view of a sheet including a plurality of characters in accordance with the disclosure.

A top view of an example of a sheet 702 illustrating a plurality of characters is shown in FIG. 7. The sheet 702 is sized and shaped to overlie the touch-sensitive display 118. The sheet includes a plurality of raised bumps, or dots, in the form of Braille characters 704, and each Braille character 704 corresponds to an alphanumeric character. In the example of FIG. 7, the Braille characters 704 include alphabetical characters for the English alphabet as well as the pound (#) symbol and the period. The Braille characters 704 for the numbers 1, 2, 3, 4, 5, 6, 7, 8, 9, and 0 correspond to the Braille characters 704 for the letters a through j. Each of the Braille characters 704 may be separated from the other Braille characters 704 by a small space to facilitate distinguishing between the characters. The sheet 702 is thin to facilitate detection of a touch on the sheet 702 by the touch-sensitive display 118 when the sheet 702 is disposed on the touch-sensitive display 118.

Each Braille character 704 on the sheet 702 is associated with an area of the touch-sensitive display 118 such that a touch on any of the Braille characters 704, when the sheet 702 is disposed on the touch-sensitive display 118, is determined to be associated with the area on the touch-sensitive display 118 that is associated with the corresponding character, such as the corresponding alphanumeric character or symbol.

Figure 8:
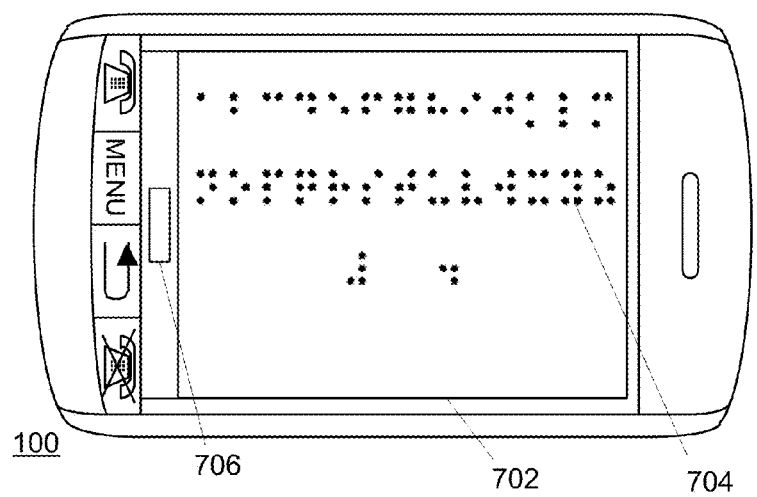
FIG. 8 is a top view of a portable electronic device including a sheet disposed on a touch-sensitive display.

Optionally, a magnet 706 may be integrated into the sheet 702 or otherwise attached to the sheet 702. The magnet 706 may be located at any suitable position on the sheet 702 without interfering with the Braille characters 704. In the example of FIG. 7 and FIG. 8, the sheet 702 is greater in size than the display 112, and the magnet 706 is attached to the sheet 702 near one end, such that the magnet 706 is disposed near the display 112. The magnet 706 facilitates detection of the sheet 702 utilizing the sensor 140, which may be a Hall effect sensor, when the sheet 702 is disposed on the touch-sensitive display 118. Optionally, a plurality of magnets may be integrated into or otherwise attached to the sheet 702 to facilitate alignment of the sheet 702 with the portable electronic device 100. The plurality of magnets may be aligned with a plurality of Hall effect sensors to facilitate sensing of the sheet 702. Alternatively, the sheet 702 may be detected on the touch-sensitive display 118 utilizing, for example, a mechanical sensor or any other suitable sensor.

The sheet 702 may be disposed on or removed from the touch-sensitive display 118. When disposed on the touch-sensitive display 118, the sheet 702 may be aligned with and retained on the touch-sensitive display 118 in any suitable manner. For example, the sheet 702 may be retained on the touch-sensitive display 118 by mechanical interlock, by magnetic force utilizing magnets, or in any other suitable manner.

Figure 9:
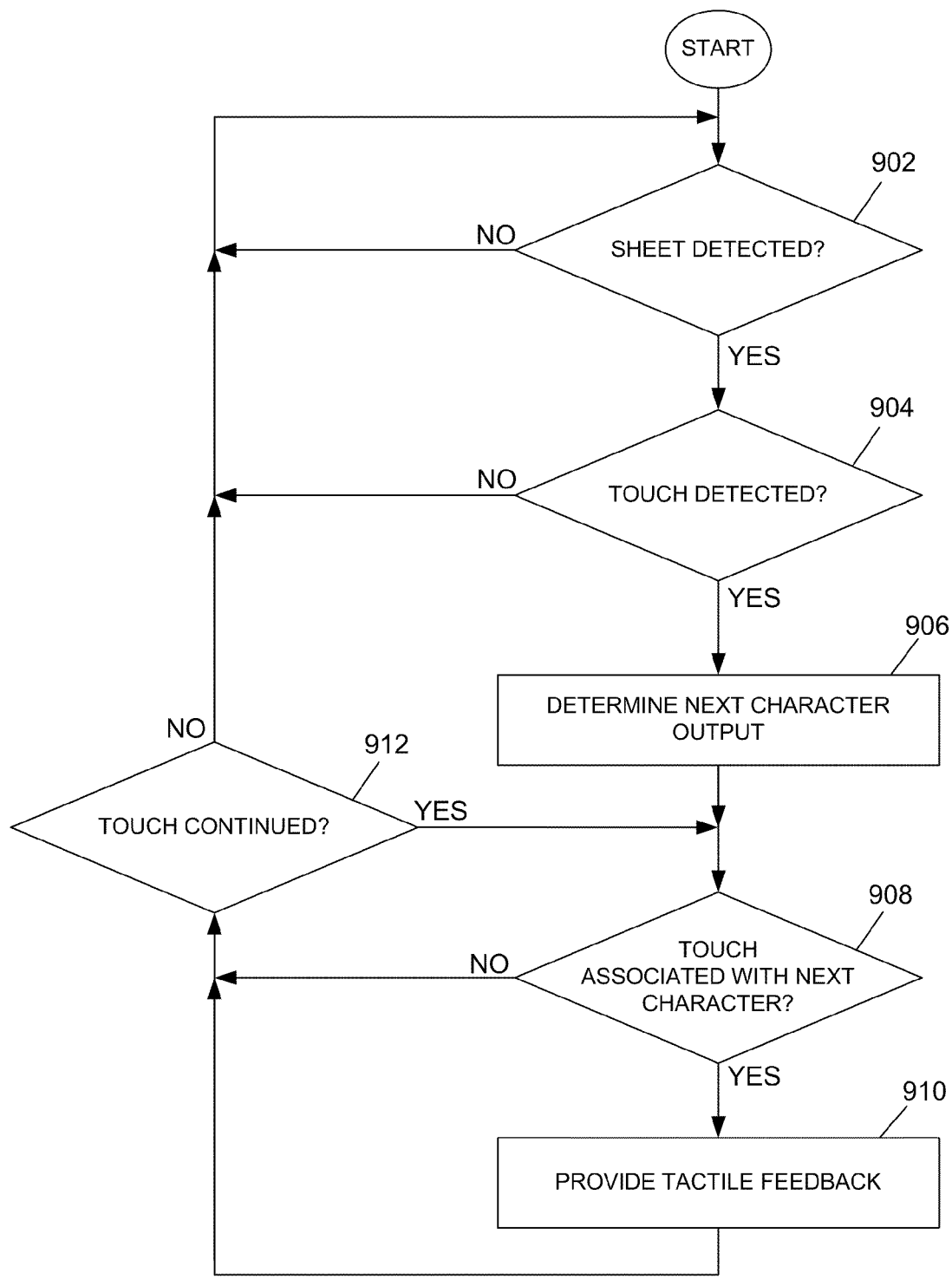
FIG. 9 is a flowchart illustrating a method of character output in accordance with the disclosure.

A flowchart illustrating a method of character output at an electronic device, such as the portable electronic device 100, is shown in FIG. 9. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium.

The sheet may be applied in any suitable application, such as, an email application, a text messaging application, a calendar application, a tasks application, an address book application, or any other suitable application in which characters may be output. When the sheet 702 is disposed on the touch-sensitive display 118, the sheet 702 is detected 902, and a touch on the sheet 702 is detected 904 by the touch-sensitive display 118, the next character output is determined 906. The next character output may be, for example, the subsequent character in consecutive order for a string of data. For example, the data may be alphanumeric text of an email body. When a character is not yet output, the next character is the first character of the alphanumeric text of the email body. When characters are output, the next character is the subsequent character in the string of data. When the touch is associated with the next character at 908, tactile feedback is provided 910 to identify the next character. The touch is associated with the next character at 908 when the touch is located at the corresponding Braille character on the sheet 708, as determined by signals from the touch-sensitive display 118. The tactile feedback that is provided 910 may be any suitable tactile feedback and may be provided by any suitable device or mechanism. In the example of the portable electronic device 100 shown in FIG. 1, the charge/voltage at the piezo actuators 120 is controlled to provide tactile feedback, such as a pulse or vibration. Alternatively, a vibration motor or other suitable device may be utilized to provide the tactile feedback.

When the touch continues at 912, the process continues at 908. When the touch ends, the process continues at 902.

In the example of FIG. 9, the sheet 708 is automatically detected. Optionally, the sheet may be detected by detecting selection of an option, for example, from a submenu or key on the portable electronic device 100.

Figure 10:
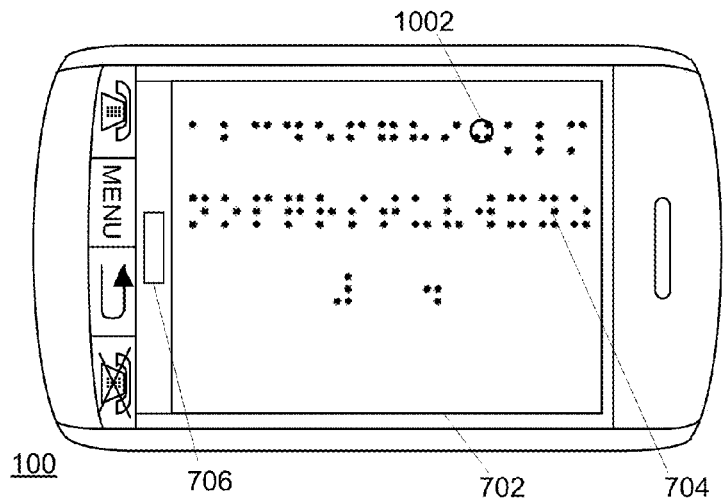
FIG. 10 illustrates a location of a touch on the sheet disposed on the touch-sensitive display in accordance with the disclosure.

A touch location on the sheet 702 disposed on the touch-sensitive display 118 is illustrated in FIG. 10. In the example shown in FIG. 10, the sheet 702 is disposed on the touch-sensitive display 118 of the portable electronic device 100, and the processor 102 executes a program, such as an email program. To output the body of the received email, a touch on the sheet 702 is detected by the touch-sensitive display 118. For the purpose of the present example, the next character output is determined to be the letter "j." When the detected touch is associated with a location 1002, which location is associated with the letter "j" that is associated with the corresponding Braille character located on the sheet 702, tactile feedback is provided. For example, a pulse may be provided by the piezo actuators 120.

A user of the portable electronic device 100 may move their finger along the Braille characters 704 on the sheet 702. When the touch is at the location associated with the next character output, tactile feedback is provided to identify the next character.

A touch-sensitive display 118 that is operable to detect multiple simultaneous touches may be utilized. Optionally, different tactile feedback may be provided depending on the side of the touch-sensitive display 118 on which the touch is detected. The portable electronic device 100 may also be operable to determine attributes of the touch such as area and shape of the touch and, based on these attributes, determine which of the right or left hand is utilized for the touch. The tactile feedback provided may be dependent on the hand. Different tactile feedback facilitates use of multiple touches to identify characters.

Figure 11:
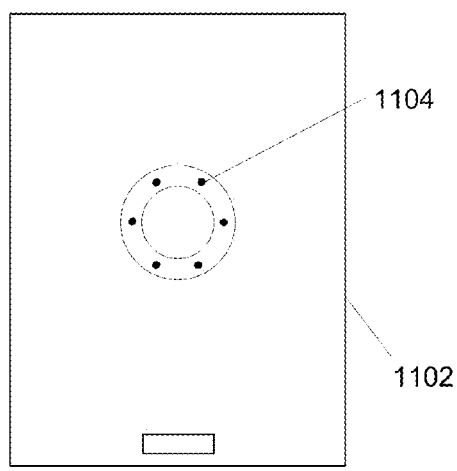
FIG. 11 is a top view of another sheet including a plurality of characters in accordance with the disclosure.

A top view of another example of a sheet 1102 illustrating a plurality of characters is shown in FIG. 11. The sheet 702 is sized and shaped to overlie the touch-sensitive display 118. The sheet includes six raised bumps 1104 or dots arranged in a circular pattern to correspond to the dot positions 1 through 6 Braille characters. Three of the raised bumps 1104 are located on the left side of the circular pattern and correspond with dot positions 1, 2, and 3. Three of the raised bumps 1104 are located on the right side of the circular pattern and correspond with dot positions 4, 5, and 6. In a clockwise direction around the circular pattern beginning at the top center of the circle as shown the drawing, the raised bumps 1104 correspond with dot positions 4, 5, 6, 3, 2, and 1.

Each of the raised bumps 1104 on the sheet 1102 is associated with an area of the touch-sensitive display 118 such that a touch on any one of the raised bumps 1104, when the sheet 1102 is disposed on the touch-sensitive display 118, is determined to be associated with the area on the touch-sensitive display 118 that associated with a corresponding character. A larger pattern may be utilized than the one shown in FIG. 11. The area associated with each of the raised bumps 1104 may extend beyond the area shown in the drawing, e.g., peripherally around the circle and/or radially outward and/or inward from each dot.

Optionally, the sheet 1102 may include a magnet incorporated into the sheet 1102 or attached to the sheet 1102 to facilitate sensing of the sheet 1102 utilizing the sensor 140, which may be a Hall effect sensor, when the sheet 1102 is disposed on the touch-sensitive display 118. The sheet 1102 may be disposed on the touch-sensitive display 118, as shown in FIG. 12, or removed from the touch-sensitive display 118.

Figure 12:
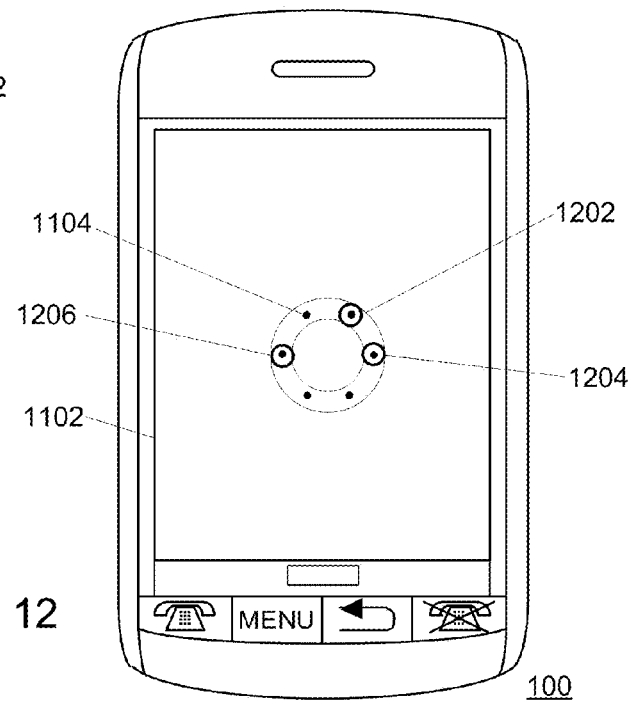
FIG. 12 is a top view of a portable electronic device including a sheet disposed on a touch-sensitive display in accordance with the disclosure.

A touch location on the sheet 1102 disposed on the touch-sensitive display 118 is illustrated in FIG. 12. In the example shown in FIG. 12, the sheet 1102 is disposed on the touch-sensitive display 118 of the portable electronic device 100 and the processor 102 executes a program, such as an email program. To output the body of the received email, a touch on the sheet 1102 is detected by the touch-sensitive display 118. For the purpose of the present example, the next character output is determined to be the letter "j." The letter "j" corresponds to raised bumps at dot positions 2, 4, and 5. When a detected touch is associated with a location 1202, which location is associated with the raised bump at the dot position 4, tactile feedback is provided. For example, a pulse may be provided by the piezo actuators 120. When the touch continues and the detected touch is associated with the location 1204 associated with the raised bump at the dot position 5, tactile feedback is provided. When the touch continues, and the detected touch is associated with the location 1206 associated with the raised bump at the dot position 2, tactile feedback is provided. Tactile feedback is thus provided at locations associated with each of the dot positions 2, 4, and 5 in this example, and tactile feedback is not provided at locations associated with each of the dot positions 1, 3, and 6 in this example in order to communicate the letter "j" tactilely.

A user of the portable electronic device 100 may move their finger around the circular pattern of raised bumps 1104. When the touch is at a location associated with the next character output, which in this example, includes locations at which the corresponding Braille character includes a dot, tactile feedback is provided. Once a touch associated with each of the bumps 1104 is completed, the character following the next character in the data is output tactilely. For example, if "job" is the part of the data being communicated, an "o" is communicated following "j" in the above example.

In the above examples, a 6-dot Braille system is shown and described. Alternatively, the process may be applied to an 8-dot Braille system.

A sheet is utilized to correspond to a plurality of characters, and tactile feedback is provided to identify a next character output. The tactile feedback is utilized to facilitate identification of characters associated with the sheet. Utilizing the sheet with the portable electronic device, data output may be provided through tactile feedback. Identification of output may be performed in combination with other systems and processes to facilitate output for the visually impaired. For example, the sheet and method described may be utilized in combination with voice synthesis to facilitate reading of a name or unusual word or term. In this example, voice synthesis may be utilized for text. When a name is synthesized, the sheet may be utilized to determine the spelling of the name.

A method includes detecting a sheet corresponding to a plurality of characters on a touch-sensitive input device; detecting, by the touch-sensitive input device, a touch; determining a next character output; in response to determining that the touch is associated with a location on the sheet, which location is associated with the next character, providing tactile feedback to identify the next character. An electronic device includes a touch-sensitive input device configured to detect a touch associated with a location on a sheet disposed on the touch-sensitive input device, wherein the sheet corresponds to a plurality of characters, an actuator arranged and constructed to provide tactile feedback, and a processor coupled to the touch-sensitive input device and the actuator and configured to detect the sheet on the-sensitive input device and actuate the actuator in response to determining that the touch is associated with a location that is associated with a next character output.

A method includes determining a next character output, detecting, by a touch-sensitive input device, a touch, and in response to determining that a location of the touch is associated with a Braille character that is associated with the next character, providing tactile feedback to identify the Braille character. An electronic device includes a touch-sensitive input device configured to detect a touch, an actuator arranged and constructed to provide tactile feedback, and a processor coupled to the touch-sensitive input device and the actuator and configured to determine a next character output and actuate the actuator in response to determining that the touch is associated with a Braille character that is associated with the next character output.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   detecting a sheet including a plurality of raised characters on a touch-sensitive input device;
   detecting, by the touch-sensitive input device, a touch at a location on the sheet;
   determining a next character of a plurality of characters in sequence to output;
   in response to determining that the location is associated with the next character, providing tactile feedback to identify the next character.

2. The method according to claim 1, wherein the location is associated with the next character when the location is at a corresponding Braille character on the sheet.

3. The method according to claim 1, wherein the sheet is a Braille overlay.

4. The method according to claim 1, wherein the touch-sensitive input device comprises a touch-sensitive display.

5. The method according to claim 1, wherein providing tactile feedback comprises actuating an actuator.

6. The method according to claim 1, comprising repeating determining the next character and providing tactile feedback for each of the plurality of characters in sequence.

7. The method according to claim 1, wherein no tactile feedback is provided when the location is not associated with the next character.

8. The method according to claim 7, wherein the location is associated with the next alphanumeric character when the location is at a Braille character corresponding to the next character.

9. The method according to claim 7, wherein the location is associated with the next character when the location is at a dot position of a Braille character corresponding to the next character.

10. The method according to claim 9, comprising repeating providing tactile feedback for each of the plurality of characters.

11. A computer-readable medium having computer-readable code executable by at least one processor of a portable electronic device to perform the method according to claim 1.

12. An electronic device comprising:
    a touch-sensitive input device configured to detect a touch at a location on a sheet disposed on the touch-sensitive input device, wherein the sheet includes a plurality of raised characters;
    an actuator arranged and constructed to provide tactile feedback;
    a processor coupled to the touch-sensitive input device and the actuator and configured to detect the sheet on the-sensitive input device and actuate the actuator in response to determining that the location is associated with a next character of a plurality of characters in sequence to output.

13. The electronic device according to claim 12, wherein the touch-sensitive input device comprises a touch-sensitive display.

14. The electronic device according to claim 12, wherein the sheet is a Braille overlay.

15. The electronic device according to claim 12, wherein the location is associated with the next character output when the location is at a corresponding Braille character on the sheet.

16. The electronic device according to claim 12, wherein no tactile feedback is provided when the location is not associated with the next character.

17. The electronic device according to claim 16, wherein the location is associated with the next character when the location is at a Braille character corresponding to the alphanumeric character.

18. The electronic device according to claim 16, wherein the location is associated with the next character when the location is at a dot position of a Braille character corresponding to the next character.

19. The electronic device according to claim 18, wherein tactile feedback is provided for each of the plurality of characters.

20. A method comprising:
   associating each of a plurality of Braille characters with a different area of a touch-sensitive input device;
   determining a next character of a plurality of characters in sequence to output utilizing tactile feedback;
   detecting, by a touch-sensitive input device, a touch;
   in response to determining that a location of the touch is within an area associated with a first character of the plurality of Braille characters that is associated with the next character, providing the tactile feedback to identify the first character.

21. The method according to claim 20, wherein the plurality of Braille characters is disposed on an overlay on the touch-sensitive input device.

22. The method according to claim 20, wherein the touch-sensitive input device comprises a touch-sensitive display.

23. The method according to claim 20, wherein providing tactile feedback comprises actuating an actuator.

24. The method according to claim 20, comprising repeating determining the next character output and providing tactile feedback for each of a plurality of characters.

25. The method according to claim 20, wherein no tactile feedback is provided when the touch is not within an area associated with the next character.

26. A computer-readable medium having computer-readable code executable by at least one processor of a portable electronic device to perform the method according to claim 20.

27. An electronic device comprising:
   a touch-sensitive input device configured to detect a touch;
   a sensor configured to detect a sheet disposed on the touch-sensitive input device, wherein the sheet includes a plurality of Braille characters;
   an actuator arranged and constructed to provide tactile feedback through the touch-sensitive input device;
   a processor coupled to the touch-sensitive input device, the sensor, and the actuator and configured to:
      associate each of the plurality of Braille characters with a different area of the touch-sensitive input device;
      determine a next character of text comprising a plurality of characters in sequence to output utilizing the tactile feedback; and
      actuate the actuator to provide the tactile feedback in response to determining that the touch is associated with a first area, wherein the first area is associated with a first character of the plurality of Braille characters that is associated with the next character to output.

28. The electronic device according to claim 27, wherein the sheet is an overlay on the touch-sensitive input device.

29. The electronic device according to claim 27, wherein the touch-sensitive input device comprises a touch-sensitive display.

30. The electronic device according to claim 27, wherein no tactile feedback is provided when the touch is not associated with the first area.

* * * * *